United States Patent
Zhang et al.

(10) Patent No.: US 12,504,993 B2
(45) Date of Patent: Dec. 23, 2025

(54) HIGH-THROUGHPUT CONFIDENTIAL COMPUTING METHOD AND SYSTEM BASED ON RISC-V ARCHITECTURE

(71) Applicant: Nanhu Laboratory, Jiaxing (CN)

(72) Inventors: Lei Zhang, Jiaxing (CN); Zedong Wang, Jiaxing (CN)

(73) Assignee: Nanhu Laboratory, Jiaxing (CN)

( * ) Notice: Subject to any disclaimer, the term of this patent is extended or adjusted under 35 U.S.C. 154(b) by 0 days.

(21) Appl. No.: 18/958,961

(22) Filed: Nov. 25, 2024

(65) Prior Publication Data

US 2025/0245048 A1    Jul. 31, 2025

(30) Foreign Application Priority Data

Jan. 26, 2024 (CN) .......................... 202410110048.1

(51) Int. Cl.
G06F 9/50  (2006.01)
(52) U.S. Cl.
CPC .......... G06F 9/5027 (2013.01); G06F 9/5016 (2013.01)
(58) Field of Classification Search
CPC .............................. G06F 9/5027; G06F 9/5016
See application file for complete search history.

(56) References Cited

U.S. PATENT DOCUMENTS

| | | | | |
|---|---|---|---|---|
| 7,822,979 | B2 * | 10/2010 | Mittal | G06F 21/72 |
| | | | | 711/152 |
| 11,416,619 | B1 * | 8/2022 | Paczkowski | G06F 21/575 |
| 2024/0362175 | A1 * | 10/2024 | Chen | G06F 13/24 |

OTHER PUBLICATIONS

CN104992122A English Translation (Year: 2015).*
Cn 115344871A English Translation (Year: 2022).*
Liu, Jingbin, Yu Qin, and Dengguo Feng. "SeRoT: A secure runtime system on trusted execution environments." 2020 IEEE 19th International Conference on Trust, Security and Privacy in Computing and Communications (TrustCom), pp. 30-37. (Year: 2020).*
First Chinese Office Action with English translation, Application No. 202410110048.1, Issue No. 2024030601404550, Applicant: Nanhu Laboratory, Title: High-Throughput Confidential Computing Method and System Based on Risc-V Architecture, Dated: Mar. 6, 2024.

(Continued)

Primary Examiner — Bing Zhao
Assistant Examiner — Willy W Huaracha
(74) Attorney, Agent, or Firm — Reising Ethington, P.C.

(57) ABSTRACT

A high-throughput confidential computing method and system based on a RISC-V architecture are provided. The method includes: S1, acquiring a hardware device tree configuration file to classify each physical resource into a normal partition or a security partition; S2, loading a security manager; S3, mapping memory resources in the normal and security partitions to the normal and security domains, respectively; registering CPU resources in the normal and security partitions to the normal and security domains, respectively; and registering an interrupt handler function; S4, linking an image file of a security file system with a security kernel file to generate an operating system image of the security domain; S5, reading the operating system image, and loading the same to a memory address of the security domain; and S6, executing the initialization of the security domain according to an interrupt request from the normal domain.

10 Claims, 2 Drawing Sheets

(56) References Cited

OTHER PUBLICATIONS

Chinese Notification to Grant Patent Right for Invention, Application No. 202410110048.1, Issue No. 20240402201652300, Applicant: Laboratory, Title: High-Throughput Confidential Computing Method and System Based on Risc-V Architecture, Dated: Apr. 2, 2024.

* cited by examiner

HIGH-THROUGHPUT CONFIDENTIAL COMPUTING METHOD AND SYSTEM BASED ON RISC-V ARCHITECTURE

CROSS-REFERENCE TO RELATED APPLICATION

This patent application claims the benefit and priority of Chinese Patent Application No. 202410110048.1 filed with the China National Intellectual Property Administration on Jan. 26, 2024, the disclosure of which is incorporated by reference herein in its entirety as part of the present application.

TECHNICAL FIELD

The present disclosure relates to the technical field of privacy computing, and in particular to a high-throughput confidential computing method and system based on a RISC-V architecture.

BACKGROUND

In recent years, reduced instruction set computing (RISC)-V architecture is developing rapidly. The RISC-V architecture has the advantages such as open source, scalability, and low cost, which is not only suitable for end-side such as Internet of Things, embedded master control, but also is more and more used in cloud-side scenarios such as big data, artificial intelligence, and data center.

However, with the continuous expansion of RISC-V ecosystem, the problem of data security in its application process is also facing more and more challenges, especially in the high-throughput data application scenario facing cloud computing. How to give consideration to both computing performance and data privacy protection to make the computing performance and data privacy protection organically unified and give full play to the maximum efficiency is an important topic faced by the development of RISC-V technology at present.

Confidential computing technology is a data privacy protection technology based on hardware, which provides a security isolation mechanism through a series of hardware security features and formally verified software layers, thus constructing a trusted execution environment (TEE) to protect the privacy of applications and data. At present, the corresponding technologies include Intel SGX (Software guard extensions) technology based on Intel architecture and AMD SEV (Secure encrypted virtualization) technology based on AMD architecture. However, different architectures have different principles and characteristics, and have different implementation modes for the trusted computing. These privacy protection technologies based on Intel and AMD architectures cannot be used in the RISC-V architecture. At present, the data security problems faced by the RISC-V architecture still exist, and the problems of computing performance and privacy protection in high-throughput data application scenarios under RISC-V architecture have not been solved.

This scheme aims at constructing a confidential computing environment based on RISC-V architecture using the hardware security characteristics of the RISC-V and computing software frame architecture through the software-hardware synergistic strategy, thus achieving the data privacy protection of RISC-V in the high-throughput application scenarios.

SUMMARY

An objective of the present disclosure is to provide a high-throughput confidential computing method and system based on a RISC-V architecture.

A high-throughput confidential computing method based on a RISC-V architecture includes:
- S1, acquiring a hardware device tree configuration file according to static configuration, by a user, that a RISC-V hardware platform comprises physical resources of a central processing unit (CPU) and a memory, to classify each physical resource into a normal partition or a security partition;
- S2, loading a security manager in a power-on process of the RISC-V hardware platform;
- S3, reading, by the security manager, resource partition information in the hardware device tree configuration tree file, to construct a normal domain and a security domain;
  - mapping, by a memory protection register, respective memory resources in the normal partition and the security partition to the normal domain and the security domain, respectively;
  - registering a CPU resource in the normal partition to the normal domain, and registering a CPU resource in the security partition to the security domain; and
  - registering an interrupt handler function for achieving initialization of the security domain;
- S4, linking an image file of a security file system with a security kernel file to generate an operating system image of the security domain;
- S5, reading the operating system image of the security domain, and loading the same to a memory address of the security domain; and
- S6, executing the initialization of the security domain according to an interrupt request from the normal domain.

In the high-throughput confidential computing method based on the RISC-V architecture, the method further includes: running a confidential application in an initialized security domain, and outputting an execution result of the confidential application to the security domain.

In the high-throughput confidential computing method based on the RISC-V architecture, the confidential application is packaged into the image file of the security file system, and configured to be booted up, so as to be automatically executed after the initialization of the security domain is completed.

In step S4, at each bootup, the confidential application is packaged and added to a file system, and the file system is signed to generate the image file of the security file system.

In the high-throughput confidential computing method based on the RISC-V architecture, the physical resource further includes an input/output (I/O) device and a network card; and the security manager is configured to register the physical resource in the normal partition to the normal domain, and the physical resource in the security partition to the security domain.

At least one I/O device for human-machine interaction is configured in the security partition.

In the high-throughput confidential computing method based on the RISC-V architecture, in Step S3, the interrupt handler function registered to the security manager is further configured to establish a communication between the normal domain and the security domain.

The security manager is configured to register memory size and range of start of the memory address of the respective memory resources in the normal partition and the security partition to a normal permission memory protection register and a privileged memory protection register, respectively, thus mapping the memory resource of the normal partition to the normal domain, and mapping the memory resource of the security partition to the security domain.

Prior to step S4, the method further comprises:

loading, by the security manager, an operating system image of the normal domain, to complete initialization of an operating system of the normal domain, and sending an interrupt request to the security manager.

In the high-throughput confidential computing method based on the RISC-V architecture, in Step S4, the security manager is configured to perform trusted measurement on the operating system of the security domain according to the interrupt request from the normal domain, and wake up the CPU hardware thread of the security domain after passing the measurement, thus executing the initialization of the security domain from a memory start position.

A high-throughput confidential computing system based on a RISC-V architecture includes a RISC-V hardware platform including a CPU and a memory, and having a memory protection mechanism, a storage medium, and a security manager. The system has a machine mode, a supervision mode, and a user mode. The security manager runs in the machine mode with the highest permission, the security manager is configured to construct a normal domain and a security domain according to resource partition information in a hardware device tree configuration file, and register physical resources of the RISC-V hardware platform to the security domain or the normal domain according to the device tree configuration file.

A memory resource in the security domain is registered to a privileged memory protection register, and a memory resource in the normal domain is registered to a normal permission memory protection register.

In the user mode, a normal application or confidential application is run according to a demand of a user, and when the confidential application is run, an operating system image of the security domain is loaded to the security domain to provide a runtime environment for a user-mode confidential application.

The operating system image of the security domain is obtained by linking an image file of a security file system with a security kernel file.

In the supervision mode, a normal kernel or a security kernel is run according to an application type to be run.

In the high-throughput confidential computing system based on the RISC-V architecture, the system further includes a trusted authentication module, executed by the security manager and configured to perform trusted measurement on the operating system image of the security domain.

In the high-throughput confidential computing system based on the RISC-V architecture, the storage medium is configured to store data to be stored, including an initialized bootstrap, the security manager, and an operating system image of the normal domain.

In the high-throughput confidential computing system based on the RISC-V architecture, the operating system image of the security domain is obtained at each bootup, and is obtained by:

signing and packaging a confidential application that the user wants to execute along with a security file system made by the user in advance, to generate an image file of the security file system;

linking the image file of the security file system with the security kernel file, to generate the operating system image of the security domain; and loading, by the security manager, the operating system image of the security domain to the security domain, and initializing the security domain under an interrupt request of the normal domain.

The present disclosure has the advantages that:

1. A method for constructing and achieving a confidential computing environment for the RISC-V architecture and suitable for high-throughput application scenarios is provided, which can achieve data privacy protection of the RISC-V in the high-throughput application scenarios.

2. A static device tree is provided to partition resources, and a memory protection mechanism of the RISC-V architecture is used to achieve the division of the normal domain and the security domain. In the security domain, the operating system, the kernel and the hardware can be realized, which can achieve high-throughput data operation scenarios such as big data analysis and machine learning. The data privacy protection of the RISC-V in the high-throughput operation scenarios can be achieved by combining the hardware security characteristics of RISC-V with the confidential computing software framework.

3. The achieved trusted execution environment can support Docker, and is upward compatible with many advanced language applications, including C/C++, Python, JAVA, JS and so on.

DETAILED DESCRIPTION OF THE EMBODIMENTS

The present disclosure is further described in detail below with reference to accompanying drawings and specific embodiments.

Figure 1:
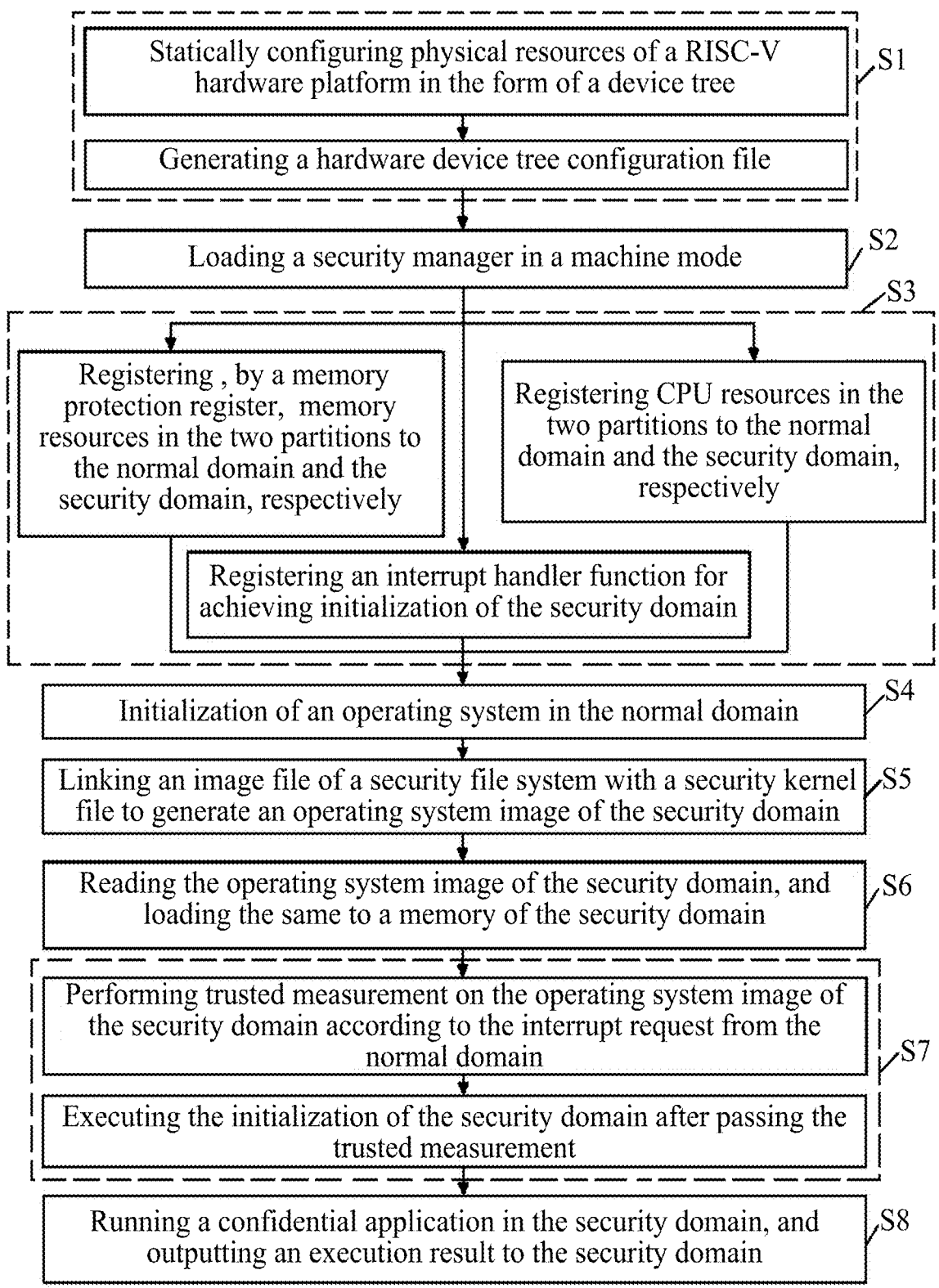
FIG. 1 is a flow diagram of a high-throughput confidential computing method based on a RISC-V architecture according to the present disclosure.

As shown in FIG. 1, a high-throughput confidential computing method based on a reduced instruction set computing (RISC)-V architecture is provided, including steps S1-S8.

In S1, physical resources of a RISC-V hardware platform are statically configured in the form of a device tree, including a central processing unit (CPU), a memory, an input/output (I/O) device, a network card, and the like, and physical resources are divided into two partitions (including a normal partition and a security partition) according to the address. The security partition is at least configured with one I/O device for human-machine interaction, and other resources are configured according to actual application demands. The total resources of the two partitions are equal to the total resources of the hardware platform, and a hardware device tree configuration file (DTB (device tree blob)) is generated after the configuration is completed. This step can be completely completed manually by a user or assisted by the user.

In S2, in a power-on initialization stage of the RISC-V hardware platform, a security manager is loaded in a machine mode.

In S3, resource partition information in the device tree configuration file is read by the security manager at the power-on initialization stage to construct a normal domain and a security domain. The security manager is bottom firmware of the RISC-V architecture, which has the highest permission and is the earliest booted after the system is powered on.

Through a physical memory protection (PMP) mechanism of the RISC-V, the security manager registers the memory size and the range of start of the memory address contained in the two partitions to two groups of memory protection registers, that is, the memory sizes and the ranges of start of the memory addresses of the respective memory resources contained in the normal partition and the security partition are registered to a normal permission memory protection register and a privileged memory protection register, respectively, thus mapping the memory resource of the normal partition to the normal domain, and the memory resource of the security partition to the security domain, thus achieving the access isolation of the memory between the two partitions.

Meanwhile, according to the partition information of the device tree, the CPU and I/O resources in the two partitions are registered to two domains, i.e., the normal domain and the security domain, thus achieving the resource isolation of the two domains.

In this scheme, the memory protection mechanism is combined with a static device tree to perform resource partition, and the security manager of the RISC-V architecture is used to achieve isolation, thus achieving the partition of CPU, the memory, and other resources. Combined with the subsequent generation of operating system images in the security domain, the respective operating systems, kernels and hardware are achieved in the normal domain and the security domain, respectively, which can support high-throughput data operation scenarios such as big data analysis, and machine learning.

In addition, in S3, an interrupt handler function is registered in the security manager, and an interrupt request from the normal domain is accepted. The interrupt handler function is configured to achieve the initialization of the security domain and establish the communication between the normal domain and the security domain.

In S4, an operating system image of the normal domain is loaded by the security manager to complete the initialization of an operating system in the normal domain, where the kernel of the normal domain is a linux kernel, and the operating system includes, but is not limited to, ubuntu, centos and the like.

In S5, the user can make a file system using a buildroot tool. When the system is booted, an executable file of a confidential application that the user wants to execute and a dependency library are packaged and added to the file system, which is configured to be booted up, and the file system is signed with a key to obtain a signed packaged file, i.e., an image file of the security file system. The image file of the security file system is linked with a security kernel file to generate an operating system image of the security domain.

The security kernel file in this embodiment is made using 6.0 version of the linux system in advance, and in the process of making the security kernel, a path of the image file of the security file system is specified, and the image file of the security file system is linked with the security kernel file according to the path when the operating system image of the security domain needs to be generated.

In this scheme, it is proposed to use a user-made file system, and when the system is booted, the operating system image of the security domain is generated based on the file system through a series of means, thus providing a runtime environment for the user-mode confidential application and achieving the security domain operating system in the security domain. Moreover, the file system integrates a high-level language runtime library, which is upward compatible with many high-level language applications, including C/C++, Python, JAVA, JS, etc., and can integrate Docker containers, thus making the confidential environment to support Docker in various languages.

In S6, the operating system of the normal domain is logged in, the operating system image of the security domain is read, and the operating system image of the security domain is loaded to a start position of the memory address of the security domain. An action of reading the operating system image of the security domain can be triggered by inputting a corresponding start command by the user.

In S7, in a normal operating system, an interrupt request is initiated to the security manager, and the security manager is configured to perform trusted measurement on the operating system image of the security domain, including signature verification and hash measurement of the security file system. After the measurement is completed, a CPU hardware thread (HART) of the security domain is waken up to execute the initialization of the security kernel from the start position of the memory.

In S8, the confidential application is executed after the initialization of the security kernel is completed, and an execution result is output through the I/O device in the security domain. During the execution, an external user cannot access the any data in the security domain, thus achieving the privacy protection of sensitive data.

Figure 2:
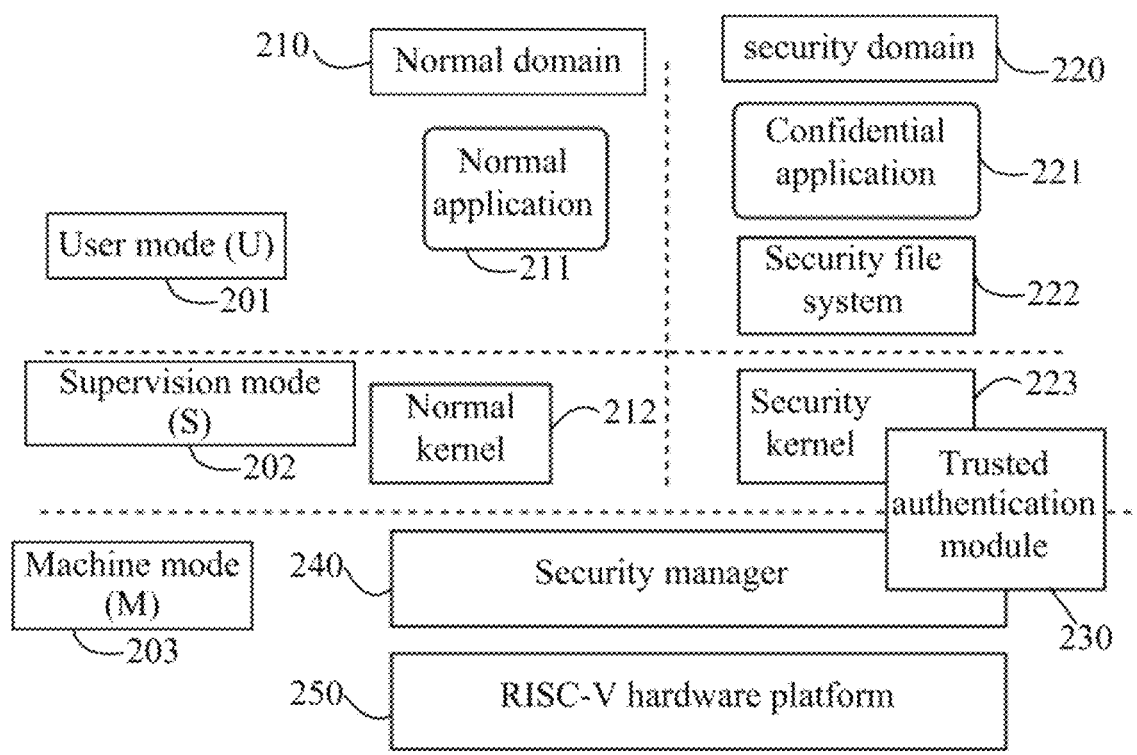
FIG. 2 is a system structural block diagram of a high-throughput confidential computing system based on a RISC-V architecture according to the present disclosure.

Further, as shown in FIG. 2, this scheme further provides a software-hardware synergistic high-throughput confidential computing system based on a RISC-V architecture, which uses a RISC-V hardware platform 250 with a memory protection mechanism and a security manager 240, and the hardware platform includes a CPU, a memory, a network card, and an I/O device, etc.

The RISC-V hardware platform 250, as a hardware foundation of a confidential computing system, integrates 64-bit RISC-V basic instruction set and control and status register extension (Zicsr), and provides three privileged modes, including a machine mode 203, a supervision mode 202 and a user mode 201, and the software running in different modes has different privileged levels. A physical memory protection mechanism (PMP) is provided, these characteristics provide a hardware support for the realization of various functions of the confidential computing system. Based on these characteristics, this scheme can achieve data privacy protection of the RISC-V architecture for the high-throughput application scenarios.

The security manager 240 runs in the machine mode 203, is core firmware of the confidential computing system, and has the highest permission of the system, which, by using security characteristics of the RISC-V hardware platform 250, can construct the normal domain 210 and the security domain 220 according to the resource partition information in the hardware device tree configuration file. The physical resources of the RISC-V hardware platform 250 are registered to the security domain 220 or the normal domain 210 according to the device tree configuration file. The physical resources of the system are partitioned through the above way to obtain an independent security domain. An external user and program cannot directly access any resource in the security domain 220, thus achieving isolation protection of the data in the security domain 220.

The memory resource in the security domain 220 is registered to a privileged memory protection register. The memory resource in the normal domain 210 is registered to a normal permission memory protection register.

The security kernel 223 runs in the isolated and protected security domain 220 and has the characteristics of a macro kernel, which is responsible for the hardware resource management in the security domain 220, including memory management, CPU interrupt handling, device and network driver management, etc., and is responsible for process scheduling, upward providing a system call interface to support the user-mode program running in the security world.

In the user mode 201, a normal application 211 or confidential application 221 is run according to a demand of the user, and when the confidential application 221 is run, an operating system image of the security domain 220 is loaded to the security domain 220 to provide a runtime environment for a user-mode confidential application. In the supervision mode 202, the normal kernel 212 or security kernel 223 is run according to the application type needing to run. The security kernel 223 and the normal kernel 212 can run at the same time.

The three modes, i.e., the machine mode 203, the supervision mode 202 and the user mode 201, represent three states of a CPU core. The CPU core is only in one mode at one time, and the permissions of the CPU corresponding to the three modes are different, the lowest permission is the user mode 201, and the highest permission is the machine mode 203. There are three modes in the normal domain 210 or the security domain 220. In short, at a point in time, the CPU may execute the application, execute a kernel code, or the code in the security manager 240, and the execution of the application, the execution of the kernel code and the execution of the code in the security manager 240 generally switch frequently. The software under different modes has different permissions, and thus the permission of the security manager 240 is the highest, and the permission of the application is the lowest, which is a security strategy that comes with RISC-V.

In addition, the system further includes a trusted authentication module 230 and a storage medium. The storage medium is configured to store a system initialization bootstrap, the security manager 240, and an operating system image of the normal domain 210, and its types include, but are not limited to, a secure digital (SD) card, serial peripheral interface (SPI) FLASH, etc. The system initialization bootstrap is a piece of earliest code executed by the whole RISC-V system, which is executed upon power on, and can guide the loading and execution of the security manager 240 after the execution is completed. The trusted authentication module 230 is executed by the security manager 240, which is executed at the power-on initialization stage of the confidential computing system, and is configured to perform trusted measurement on the operating system image of the security domain 220, which specifically includes several steps, such as the trusted measurement, the generation of a trusted digital report, and security signature. The finally generated digital report can be used as a trusted certificate and is provided to the external user of the confidential computing system, for proving the authenticity and trustworthiness of the system.

An operating principle of the system is as follows: the security manager 240 running in machine mode 203 has the highest permission in the system, by which an independent security domain is split out according to the resource partition information in the hardware device tree configuration file using the security characteristics of the RISC-V hardware platform 250. The external user and the application cannot directly access any resources in the security domain 220, thus achieving the privacy protection of sensitive data. The security domain 220 includes one security kernel 223 and one security file system 222, and provides a basic kernel support and runtime environment for the upper-level confidential applications.

Specific embodiments described in this embodiment are only illustrative of the spirit of the present disclosure. According to the present disclosure, those skilled in the art can make various modifications or supplements to the described specific embodiments or substitute them in a similar way, without departing from the spirit of the present disclosure or exceeding the scope defined in the appended claims.

What is claimed is:

1. A high-throughput confidential computing method based on a reduced instruction set computing (RISC)-V architecture, comprising:
   acquiring a hardware device tree configuration file according to static configuration, by a user, that a RISC-V hardware platform comprises physical resources of a central processing unit (CPU) and a memory, to divide the physical resources into a normal partition and a security partition;
   loading a security manager in a power-on process of the RISC-V hardware platform;
   reading, by the security manager, resource partition information in the hardware device tree configuration file, to construct a normal domain and a security domain;
   mapping, by a memory protection register, respective memory resources in the normal partition and the security partition to the normal domain and the security domain, respectively;
   registering a CPU resource in the normal partition to the normal domain, and registering a|CPU resource in the security partition to the security domain;
   registering an interrupt handler function in the security manager for achieving initialization of the security domain and establishing a communication between the normal domain and the security domain;
   loading, by the security manager, an operating system image of the normal domain, to complete initialization of an operating system of the normal domain, and sending an interrupt request to the security manager;
   linking an image file of a security file system with a security kernel file to generate an operating system image of the security domain;
   reading the operating system image of the security domain, and loading the operating system image to a memory address of the security domain; and
   waking up, by the security manager, a CPU hardware thread of the security domain according to an interrupt request from the normal domain, to execute the initialization of the security domain from a memory start position of the security partition
   wherein the physical resources further comprises an input/output (I/O) device and a network card; and the security manager is configured to register the physical resources in the normal partition to the normal domain, and the physical resources in the security partition to the security domain; and at least one I/O device for human-machine interaction is configured in the security partition; and wherein the security manager is configured to register memory size and range of start of the memory address of the respective memory resources in the normal partition and the security partition to a normal permission memory protection register and a privileged memory protection register, respectively, thus mapping the memory resource of the normal partition to the normal domain, and mapping the memory resource of the security partition to the security domain.

2. The high-throughput confidential computing method according to claim 1, further comprising: running a confidential application in an initialized security domain, and outputting an execution result of the confidential application to the security domain.

3. The high-throughput confidential computing method according to claim 2, wherein the confidential application is packaged into the image file of the security file system, and configured to be booted up, to be automatically executed after the initialization of the security domain is completed; and in the linking, at each bootup, the confidential application is packaged and added to a file system, and the file system is signed to generate the image file of the security file system.

4. The high-throughput confidential computing method according to claim 1, wherein in the waking up, the security manager is configured to perform trusted measurement on the operating system of the security domain according to the interrupt request from the normal domain, and wake up the CPU hardware thread of the security domain after passing the measurement.

5. The high-throughput confidential computing method according to claim 2, wherein in the waking up, the security manager is configured to perform trusted measurement on the operating system of the security domain according to the interrupt request from the normal domain, and wake up the CPU hardware thread of the security domain after passing the measurement.

6. The high-throughput confidential computing method according to claim 3, wherein in the waking up, the security manager is configured to perform trusted measurement on the operating system of the security domain according to the interrupt request from the normal domain, and wake up the CPU hardware thread of the security domain after passing the measurement.

7. A high-throughput confidential computing system based on a RISC-V architecture, comprising:
   a RISC-V hardware platform comprising a CPU and a memory, and having a memory protection mechanism,
   a storage medium, and
   a security manager,
   wherein the system has a machine mode, a supervision mode, and a user mode; the security manager runs in the machine mode with a highest permission, the security manager is configured to construct a normal domain and a security domain according to resource partition information in a hardware device tree configuration file, and register physical resources of the RISC-V hardware platform to the security domain or the normal domain according to the device tree configuration file; and wherein the security manager is configured to register memory size and range of start of a memory address of respective memory resources in a normal partition and a security partition to a normal permission memory protection register and a privileged memory protection register, respectively, through a physical memory protection (PMP) mechanism of the RISC-V, thus mapping the memory resource of the normal partition to the normal domain, and mapping the memory resource of the security partition to the security domain;
   a memory resource in the security domain is registered to a privileged memory protection register, and a memory resource in the normal domain is registered to a normal permission memory protection register;
   in the user mode, a normal application or confidential application is run according to a demand of a user, and when the confidential application is run, an operating system image of the security domain is loaded to the security domain to provide a runtime environment for a user-mode confidential application;
   the operating system image of the security domain is obtained by linking an image file of a security file system with a security kernel file; and
   in the supervision mode, a normal kernel or a security kernel is run according to an application type to be run;
   wherein the operating system image of the security domain is obtained at each bootup, and is obtained by:
   signing and packaging a confidential application that the user wants to execute along with a security file system made by the user in advance, to generate an image file of the security file system;
   linking the image file of the security file system with the security kernel file, to generate the operating system image of the security domain; and
   loading, by the security manager, the operating system image of the security domain to the security domain, and initializing the security domain under an interrupt request of the normal domain.

8. The high-throughput confidential computing system according to claim 7, further comprising:
   a trusted authentication module, executed by the security manager and configured to perform trusted measurement on the operating system image of the security domain.

9. The high-throughput confidential computing system according to claim 7, wherein the storage medium is configured to store data to be stored, comprising an initialized bootstrap, the security manager, and an operating system image of the normal domain.

10. A high-throughput confidential computing method based on a reduced instruction set computing (RISC)-V architecture, comprising:
   acquiring a hardware device tree configuration file according to static configuration, by a user, that a RISC-V hardware platform comprises physical resources of a central processing unit (CPU) and a memory, to divide the physical resources into a normal partition and er a security partition;
   loading a security manager in a power-on process of the RISC-V hardware platform;
   reading, by the security manager, resource partition information in the hardware device tree configuration file, to construct a normal domain and a security domain, wherein the normal domain corresponds to a normal kernel, and the security domain corresponds to a security kernel;
   mapping, by a memory protection register, respective memory resources in the normal partition and the security partition to the normal domain and the security domain, respectively;
   registering a CPU resource in the normal partition to the normal domain, and registering a CPU resource in the security partition to the security domain;

registering an interrupt handler function in the security manager for achieving initialization of the security domain and establishing a communication between the normal domain and the security domain;

loading, by the security manager, an operating system image of the normal domain, to complete initialization of an operating system of the normal domain, and sending an interrupt request to the security manager;

linking an image file of a security file system with a security kernel file to generate an operating system image of the security domain;

reading the operating system image of the security domain, and loading the operating system image to a memory address of the security domain; and waking up, by the security manager, a CPU hardware thread of the security domain according to an interrupt request from the normal domain, to execute the initialization of the security domain from a memory start position of the security partition;

wherein the physical resources further comprises an input/output (I/O) device and a network card; and the security manager is configured to register the physical resources in the normal partition to the normal domain, and the physical resources in the security partition to the security domain; and at least one I/O device for human-machine interaction is configured in the security partition; and wherein the security manager is configured to register memory size and range of start of the memory address of the respective memory resources in the normal partition and the security partition to a normal permission memory protection register and a privileged memory protection register, respectively, through a physical memory protection (PMP) mechanism of the RISC-V, thus mapping the memory resource of the normal partition to the normal domain, and mapping the memory resource of the security partition to the security domain.

* * * * *